(12) United States Patent
Malmberg et al.

(10) Patent No.: US 8,800,757 B2
(45) Date of Patent: Aug. 12, 2014

(54) LATERAL PLATE ELEMENT FOR A LINK MEANS INCLUDED IN A SELF-STACKING ENDLESS CONVEYOR BELT

(75) Inventors: Jonny Malmberg, Kristianstad (SE); Goran Gramby, Bjarred (SE); Jan Solminger, Astorp (SE); Urban Wilthorn, Landskrona (SE)

(73) Assignee: John Bean Technologies AB, Helsingborg (SE)

( * ) Notice: Subject to any disclaimer, the term of this patent is extended or adjusted under 35 U.S.C. 154(b) by 0 days.

(21) Appl. No.: 13/996,267

(22) PCT Filed: Nov. 24, 2011

(86) PCT No.: PCT/EP2011/070954
§ 371 (c)(1),
(2), (4) Date: Jun. 20, 2013

(87) PCT Pub. No.: WO2012/084405
PCT Pub. Date: Jun. 28, 2012

(65) Prior Publication Data
US 2013/0270074 A1    Oct. 17, 2013

(30) Foreign Application Priority Data
Dec. 21, 2010 (SE) ........................ 1051354

(51) Int. Cl.
*B65G 17/06* (2006.01)
(52) U.S. Cl.
USPC ............................ 198/848; 198/778; 198/851
(58) Field of Classification Search
USPC .................. 198/778, 848, 851, 852
See application file for complete search history.

(56) References Cited

U.S. PATENT DOCUMENTS 3,938,651 A    2/1976    Alfred
4,603,776 A *  8/1986    Olsson ........................ 198/728
(Continued)

FOREIGN PATENT DOCUMENTS

EP    0 595 617 A1    5/1994
EP    1 010 648 A1    6/2000
(Continued)

OTHER PUBLICATIONS

International Search Report mailed Apr. 4, 2012, issued in corresponding International Application No. PCT/EP2011/070954, filed Nov. 24, 2011, 4 pages.

*Primary Examiner* — Leslie A Nicholson, III
*Assistant Examiner* — Keith R Campbell
(74) *Attorney, Agent, or Firm* — Christensen O'Connor Johnson Kindness PLLC

(57) ABSTRACT

A lateral plate element (6, 6') for a link means (4, 4') for a self-stacking, helical endless conveyor belt (1), the lateral plate element, comprises an outer plate section (10), an inner plate section (20) and a bridging plate section (30) bridging the outer and inner plate sections (10, 20). The outer plate section (10) comprises a top subsection (11) extending in a first plane and wherein the inner plate section (20) comprises a top subsection (21) extending in a second plane, the second plane being offset, in an inward direction (A). The outer plate section (10) further comprises a bottom subsection (12) arranged in a bottom part of the outer plate section (10) and extending in a third plane being offset in the inward direction (A) with regard to the first plane. The lateral plate element further comprises a reinforcement (13) extending between the top subsection (11) and the bottom subsection (12) of the outer plate section (10).

20 Claims, 8 Drawing Sheets

(56) References Cited

U.S. PATENT DOCUMENTS

| | | | |
|---|---|---|---|
| 4,940,133 A | 7/1990 | Roinestad | |
| 4,941,567 A * | 7/1990 | Olsson | 198/778 |
| 5,335,590 A * | 8/1994 | Crump et al. | 99/479 |
| 5,346,057 A * | 9/1994 | Fisher et al. | 198/778 |
| 5,515,775 A * | 5/1996 | Crump et al. | 99/479 |
| 6,237,750 B1 * | 5/2001 | Damkjaer et al. | 198/778 |
| 7,258,226 B2 * | 8/2007 | Nelson et al. | 198/778 |
| 7,270,231 B2 | 9/2007 | Heber | |
| 7,500,555 B1 * | 3/2009 | Liao | 198/844.1 |
| 2005/0224316 A1 | 10/2005 | Miyanishi | |

FOREIGN PATENT DOCUMENTS

| | | |
|---|---|---|
| EP | 1 510 478 A1 | 3/2005 |
| EP | 2 119 645 A1 | 11/2009 |
| EP | 2 248 741 A1 | 11/2010 |
| EP | 2 248 751 A1 | 11/2010 |
| WO | 87/04136 A1 | 7/1987 |
| WO | 97/02196 A1 | 1/1997 |
| WO | 97/38925 A1 | 10/1997 |
| WO | 2004/005167 A1 | 1/2004 |
| WO | 2005/038549 A2 | 4/2005 |
| WO | 2006/096119 A1 | 9/2006 |
| WO | 2006/127055 A2 | 11/2006 |

* cited by examiner

LATERAL PLATE ELEMENT FOR A LINK
MEANS INCLUDED IN A SELF-STACKING
ENDLESS CONVEYOR BELT

FIELD OF INVENTION

The present invention relates to an improved lateral plate element for a link means included in a self-stacking endless conveyor belt, in which the conveyor belt extends helically along part of its length.

TECHNICAL BACKGROUND

Conveyor belts of the type described above are often used in air conditioning plants for e.g. quick-freezing or cooking of food products.

Such conveyor belts are usually made up of link means which comprise upward extending lateral plate elements and at least two parallel transverse rods connected thereto. The link means are interconnected in such a manner that the conveyor belt is turnable vertically and laterally.

The lateral plate elements of the link means of the conveyor belt may, however, be designed in various ways. Examples of conveyor belts of the above type having differently designed lateral plate elements are e.g. described in WO87/04136, WO91/04209, EP1714918, U.S. Pat. No. 6,237,750 and U.S. Pat. No. 7,270,231.

Normally each lateral plate element includes an integrally formed outer one-half plate section and an inner one-half plate section. The outer one-half plate section is slightly offset outwardly with respect to the inner one-half plate section thereby enabling the inner one-half plate section on a link means to extend over the inside surface of the outer one-half plate section on the adjacent link means. During operation, the outer one-half plate section on a link means and the inner one-half plate section on an adjacent link means overlap and slide together as the belt moves along its path.

The conveyor belt may be arranged to travel in a straight path until it enters a spiral or helical configuration. When aligned in the helical configuration, the lowermost tier of the conveyor belt is supported by a drive system while each of the remaining tiers is supported by an underlying tier. The interface between adjacent tiers is designed to keep the belt supported and laterally aligned.

During use, an upper edge of the link means in the underlying tier normally contacts the bottom surfaces of the transverse rods of the link means in the overlying tier. The tiers are laterally aligned by resting said upper edge against said transverse rods and by guide tabs arranged on the link means of the overlying tier.

One of the at least two transverse rods of a link means extend through elongated slots formed on lateral plate elements of a neighboring link means to loosely connect the two links means.

When moving in a helical configuration, longitudinally aligned tensile forces are applied to the belt causing it to stretch in the direction of travel. Also, when the belt travels in the helical path, the belt is stacked into circular tiers and stress may be created that may act as a bending force bending the link means. Moreover when the belt is stacked in tiers, the contact surfaces or points between links means in underlying and overlying tiers are gradually worn which may lead to breakage.

SUMMARY OF THE INVENTION

An object of the present invention is to provide an improved lateral plate element for a link means included in a self-stacking endless conveyor.

Another object of the present invention to provide such a lateral plate element with high stability.

Another object of the present invention to provide such a lateral plate element with high stability and reduced risk of deformation during operation.

At least one of these objects, and also other objects which will be evident from the following description, is achieved by the lateral plate element according to claim 1. Embodiments of the lateral plate element are disclosed by the dependent claims.

More specifically, according to the present invention, a lateral plate element for a link means included in a self-stacking endless conveyor belt, in which the conveyor belt extends helically along part of its length is provided. The lateral plate element comprises an outer plate section, an inner plate section and a bridging plate section bridging said outer and inner plate sections, wherein said outer plate section comprises a top subsection extending in a first plane and wherein said inner plate section comprises a top subsection extending in a second plane, said second plane being offset, in an inward direction, with regard to said first plane, wherein said outer plate section further comprises a bottom subsection arranged in a bottom part of said outer plate section and extending in a third plane being offset in said inward direction with regard to said first plane, wherein said inner plate section further comprises a bottom subsection arranged in a bottom part of said inner plate section and extending in a fourth plane being offset in said inward direction with regard to said second plane. The lateral plate element further comprises a reinforcement extending between the top subsection and the bottom subsection of the outer plate section.

This results in an improved lateral plate element having a high stability and reduced risk of deformation during operation. This is achieved more specifically by means of the reinforcement which due to that it extends between the top subsection and the bottom subsection of the outer plate section ensures that the lateral plate element will have a high resistance against torsion and exhibit a high bending rigidity, thus having a high stability.

The reinforcement may be in the form of a press shaped structure. A press shaped structure is easy and cheap to manufacture.

The reinforcement may project from the outer plate section in an outward direction opposite said inward direction. Accordingly in case of being a press shaped structure the reinforcement may bulge in said outward direction. Due to that the reinforcement is projecting/bulging in said outward direction the reinforcement does not interfere with the inner plate section of an adjacent lateral plate element of a conveyor belt comprising link means comprising lateral plate elements according to the present invention.

At least one of the top subsections may further comprise a press shaped portion. Such a press shaped portion enhances the overall stiffness of the lateral plate element. Moreover, such a press shaped portion provides flatness to the top subsection of the outer plate section wherein it is located.

The lateral plate element may further comprise at least two rod connection openings.

At least one of said at least two rod connection openings may be arranged in a part of said bottom subsection of the outer plate section over which part said reinforcement extends. Especially a part wherein the reinforcement is angled with respect to said first, second, third and fourth planes. By arranging a rod connection opening within a section of the reinforcement being angled with respect to said first, second, third and fourth planes the stress on the weld between respectively rod and the lateral plate element adjacent to respectively rod opening is reduced.

One of said at least two rod connection openings may be arranged in a bottom part of said bridging plate section.

The lateral plate element may further comprise a bottom structure connected to a bottom edge of the bottom subsection of the outer plate section, wherein the bottom structure extends in said outward direction opposite said inward direction and comprises a resting surface adjoining said bottom edge and extending in a plane orthogonal to said third plane and parallel to an axis connecting the centre of the at least two rod connection openings, a first abutment surface adjoining said resting surface and extending diagonally downward and outward. During use, the upper edge of a lateral plate element of a link means of an underlying tier contacts the resting surface, above described as the lower edge portion, of the lateral plate elements, of a link means of an overlaying tier. Thus, the tiers of the conveyor belt in the helical path are laterally aligned by resting the upper edge of the lateral plate elements of the link means of an underlying tier against the resting surfaces of the lateral plate elements of the link means of an overlying tier. The first abutment surface limits outward lateral movement of a lateral plate element of an underlying tier. Thus, when the lateral plate elements form part of a link means of a conveyor belt the first abutment surfaces of successive link means form outer abutment surfaces engaging the outer side of the upper portions of the link means of an underlying belt tier.

The bottom structure may further comprise at least one welding surface extending in a plane orthogonal to said third plane and perpendicular to said axis connecting the centre of the at least two rod connection openings. When, the lateral plate element is comprised in a link means a rod is welded to said welding surface. By welding a rod to the welding surface the overall stiffness of the bottom structure of the lateral plate element is enhanced.

The resting surface may be offset said at least two rod connection openings. Thus, when the conveyer belt is stacked in tiers, the upper edge of a lateral plate element of a link means of an underlying tier rests solely against the resting surface of a lateral plate element of a link means of an overlying tier. Because, the weight of the portion of the conveyor belt above the link means is not exerted on the transverse rods, wear on the transverse rods is reduced.

The resting surface may extend to a bottom edge of the bridging plate section. Thus, the resting surface is, at least locally, extended laterally in said inward direction. By extending the resting surface to the bottom edge of the bridging plate section wedging between a lower and upper lateral plate element in the conveyor belt is prevented. This because the upper portion of a lateral plate element is prevented to wedge in between the inner and outer plate sections.

The reinforcement may extend into the resting surface. By extending the resting surface into the resting surface the stiffness of the bottom structure may be enhanced.

The lateral plate element may further comprise a tab section connected to a bottom edge of the inner plate section, wherein the tab section extends in the inward direction and comprises a second abutment surface extending diagonally inward and downward. The second abutment surface limits inward lateral movement of a lower lateral plate element over an upper lateral plate element when the conveyor belt is in a self-stacked configuration. Moreover, the second abutment surface limits outward lateral movement of an upper lateral plate element over a lower lateral plate element when the conveyor belt is in a self-stacked configuration. Thus, when the lateral plate elements form part of a link means of a conveyor belt the second abutment surfaces of successive link means form inner abutment surfaces engaging the inner side of the upper portions of the link means of an underlying belt tier.

The tab section may further comprise a bottom spacer element extending in an outward direction opposite said inward direction (A). The lateral spacer element is arranged to prevent lateral movement between lateral plate elements of neighboring tiers or the conveyor belt.

The lateral plate element may further comprise a top spacer element extending in the inward direction and being arranged in the top subsection of said inner plate section. The top spacer element may be used as an alternative or as a complement to the bottom spacer element and is arranged to prevent lateral movement between lateral plate elements of neighboring tiers or the conveyor belt.

According to another aspect of the invention a link means for a self-stacking endless conveyor belt, in which the conveyor belt extends helically along part of its length is provided. The link means comprises at least two transverse rods and two of the above lateral elements. The at least two rods are fixedly connected to said lateral elements in order to form the link means.

According to yet another aspect of the invention a self-stacking endless conveyor belt, in which the conveyor belt extends helically along part of its length, is provided. The self-stacking endless conveyor belt comprises a plurality of the above mentioned interconnected link means.

According to a further embodiment of the invention an air conditioning plant is provided. The air conditioning plant comprises a self-stacking endless conveyor belt according to the above.

BRIEF DESCRIPTION OF THE DRAWINGS

The invention will by way of example be described in more detail with reference to the appended schematic drawings, which show presently preferred embodiments of the invention.

DETAILED DESCRIPTION OF PREFERRED EMBODIMENTS

Figure 1:
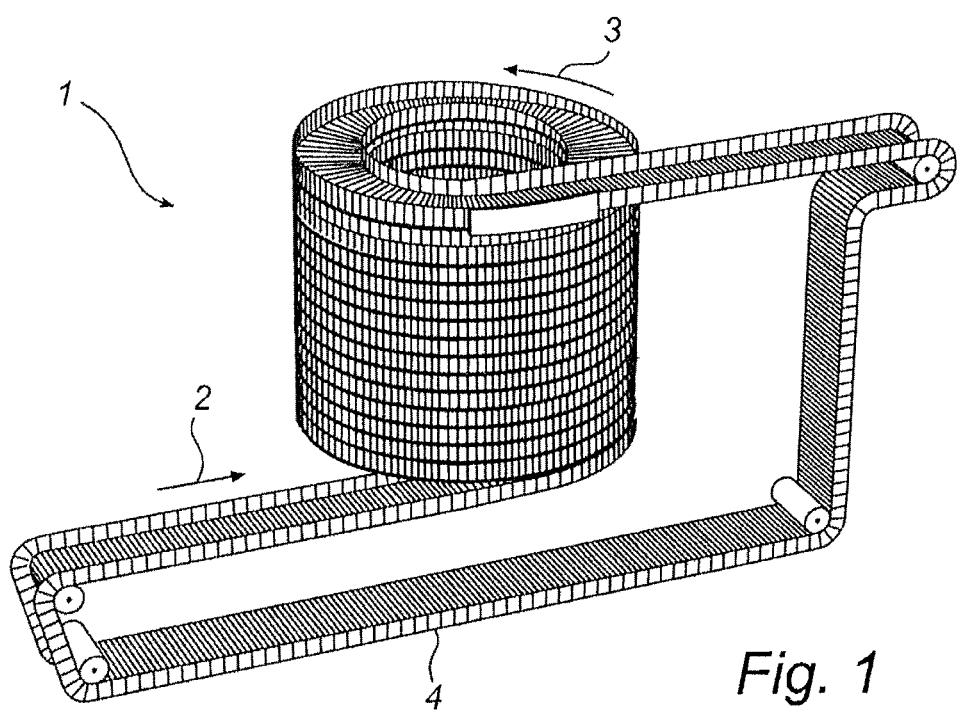
FIG. 1 is a perspective schematically showing an inventive self-stacking endless conveyor belt arranged in an endless configuration comprising straight paths and a helical path.

A self-stacking, endless conveyor belt 1 used to transport various products is shown in FIG. 1. The conveyor belt 1 is adapted to travel in straight and helical paths 2, 3, respectively. When traveling a helical path 3, the belt 1 is self-stacking with the overlying tiers resting on top of underlying tiers. The shown conveyor belt 1 comprises a plurality of interconnected link means 4 and can run straight, through curves and upwards and downwards.

Figure 2:
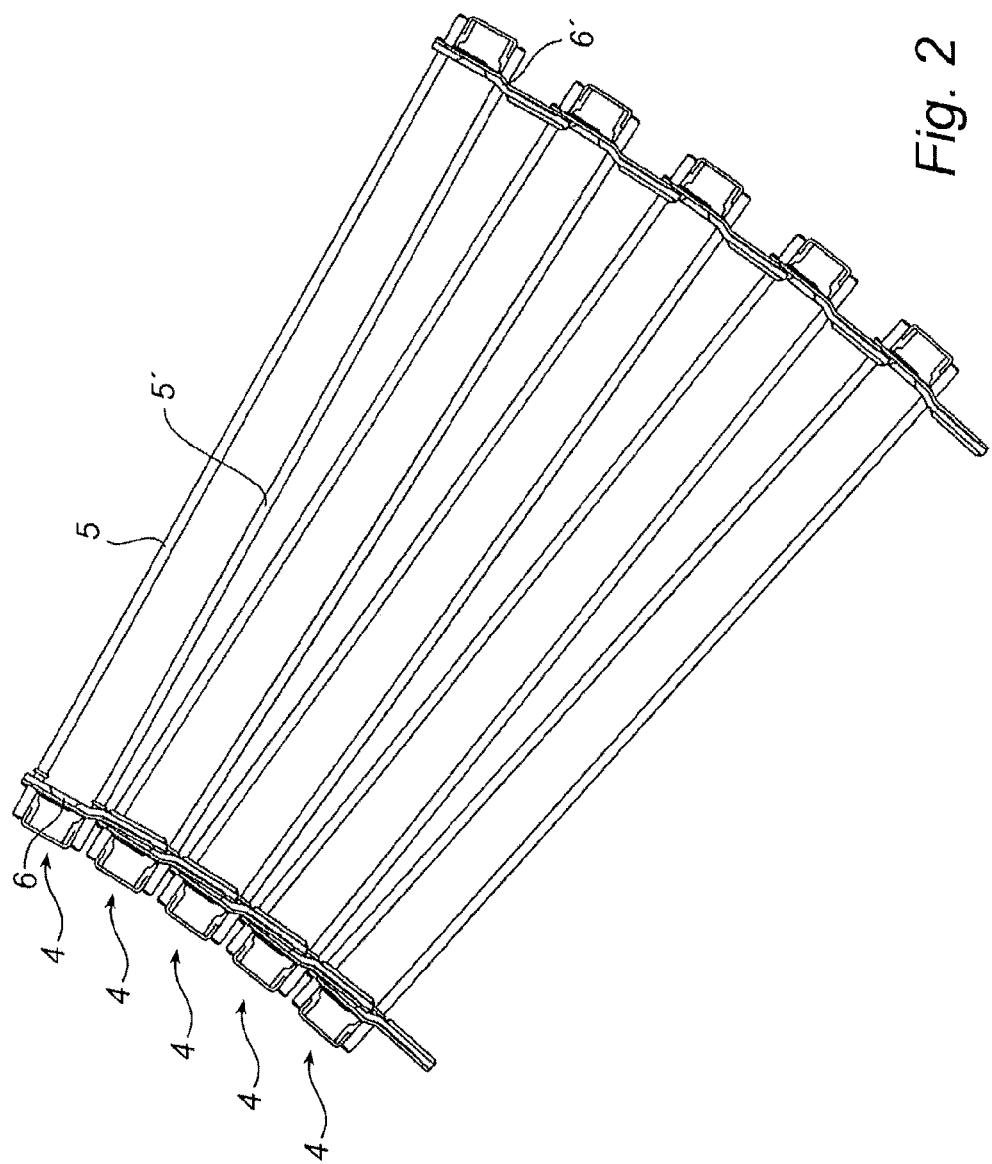
FIG. 2 is a top view of a section comprising five interconnected link means of the conveyor belt shown in FIG. 1.
Figure 3:
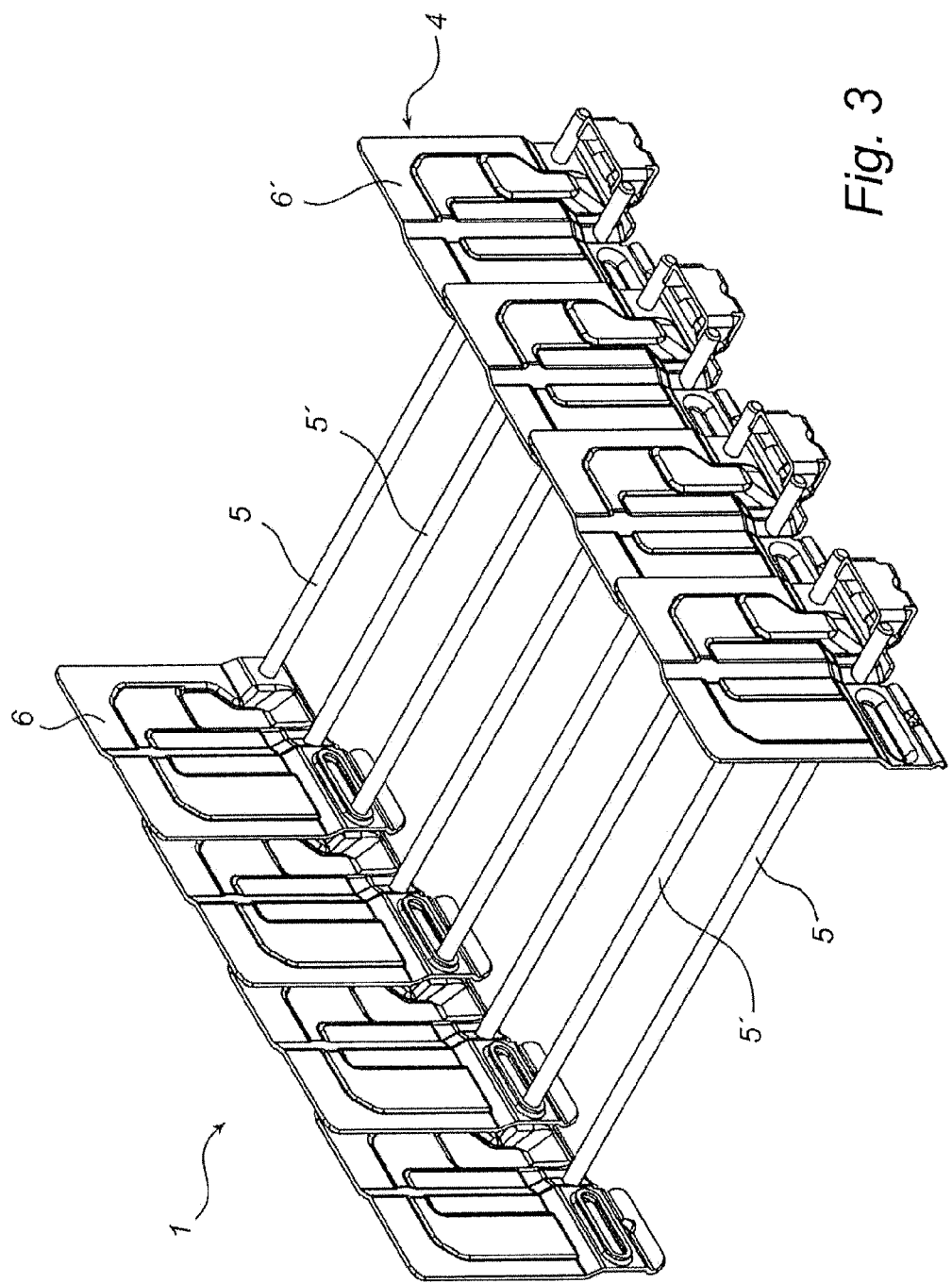
FIG. 3 is a perspective view of a section comprising four interconnected link means of the conveyor belt shown in FIG. 1.

The conveyor belt 1 is partially illustrated in FIGS. 2 and 3. As mentioned above the conveyor belt 1 comprises a plurality of interconnected link means 4. The link means 4 are moreover mutually articulated and relatively adjustable. Each link means 4 includes two transverse rods 5, 5' and two vertically, opposite lateral plate elements 6, 6', respectively. Normally a flexible support structure (not shown) is wrapped around the transverse rods 5, 5' in order to form a support structure for supporting products being conveyed on the conveyor belt 1. The two lateral plate elements 6, 6' on each link means 4 are essentially mirror copies of each other.

Figure 4:
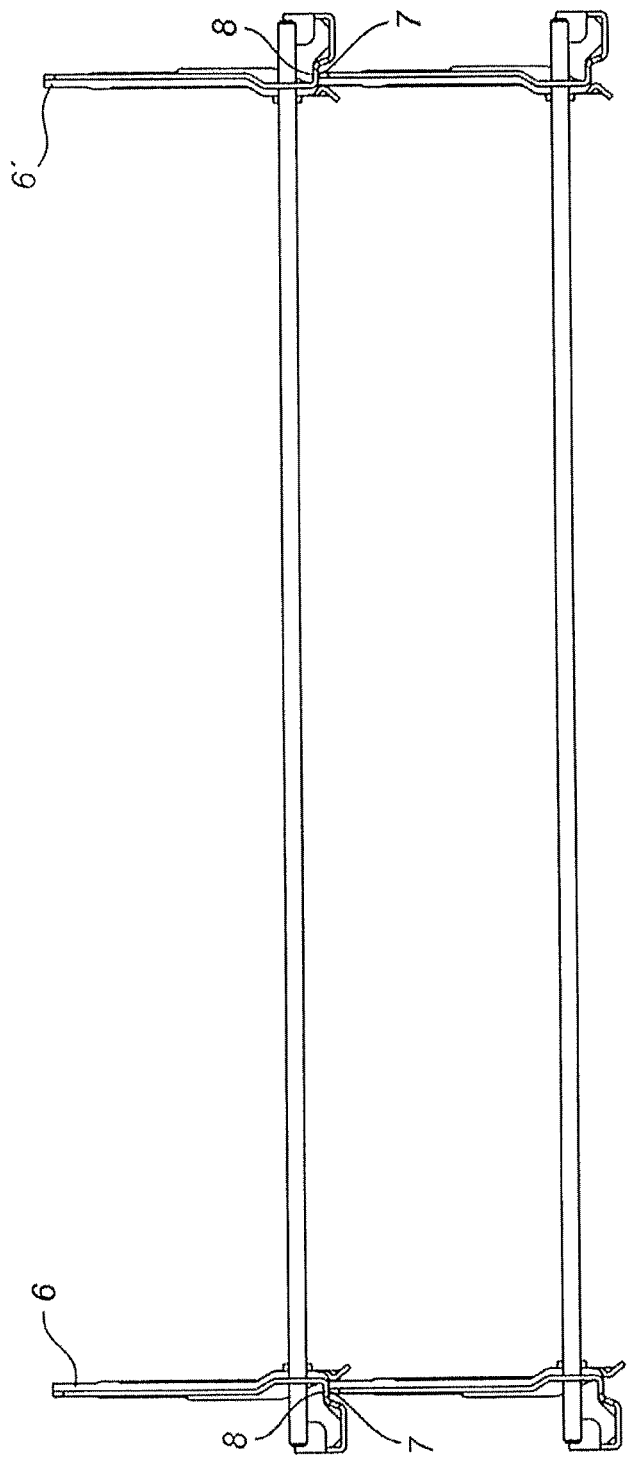
FIG. 4 is a front view showing a link means in an underlying tier and a superimposed link means in an overlying tier of the conveyor belt shown in FIG. 1.
Figure 5:
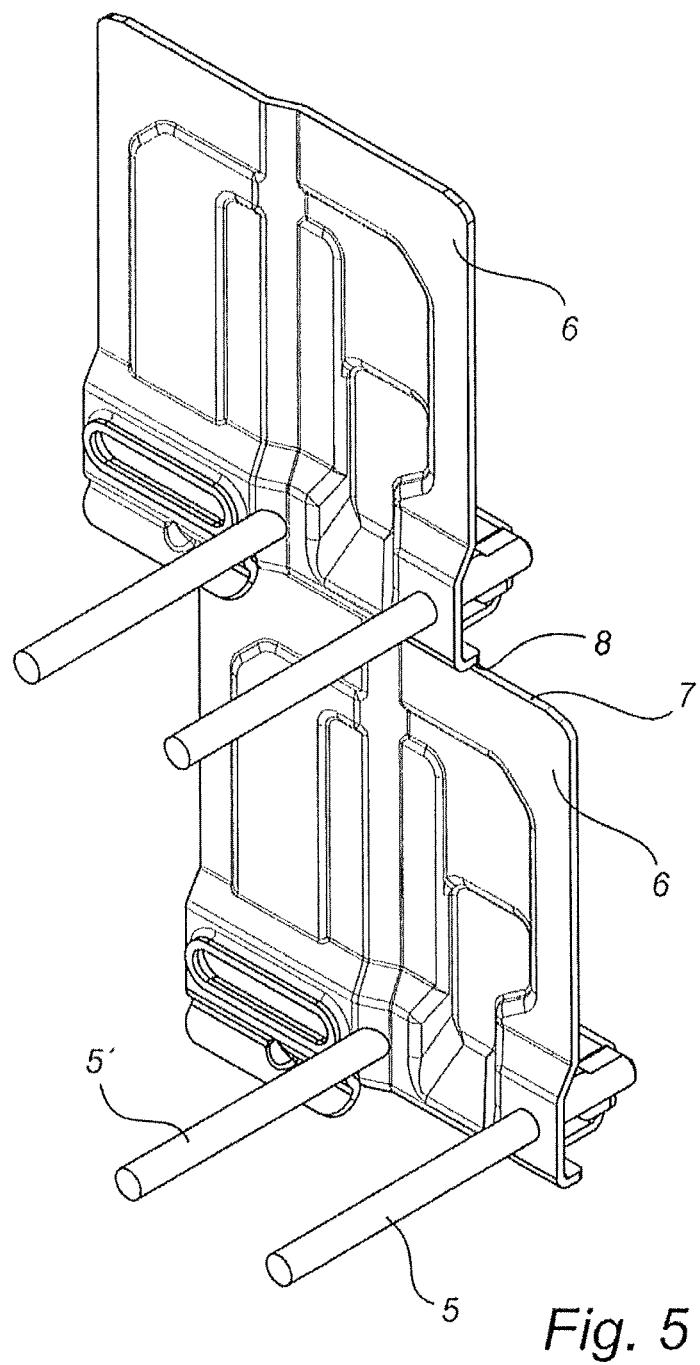
FIG. 5 is a perspective view showing a side section of the two link means shown in FIG. 4, the side section comprising two lateral plate elements in accordance with the invention.

As illustrated in FIG. 4, in order to form the helical path part of the self-stacking endless conveyor belt 1 the lateral plate elements 6, 6' of the link means 4 act as spacer means, wherein upper edge portions 7 of the lateral plate elements 6, 6' of the link means in an underlying belt tier bear against lower edge portions 8 of the lateral plate elements 6, 6' of the link means in an overlying belt tier and thus support the overlying belt tier via the respective edge portions. The self-stacking of the belt tiers of the conveyor belt 1 is also illustrated in FIG. 5.

Figure 6:
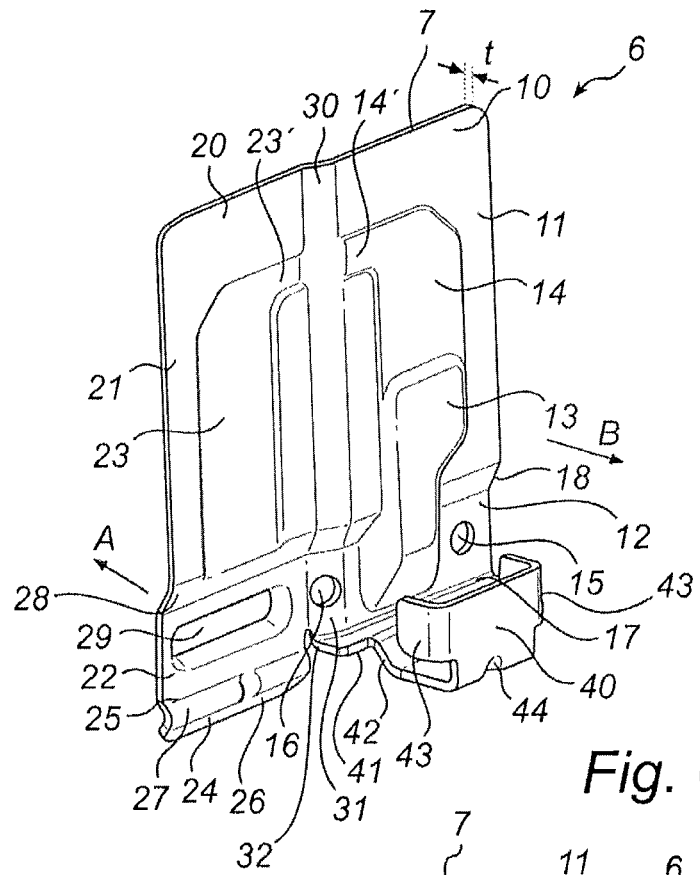
FIG. 6 is a top perspective view of a lateral plate element in accordance with a first embodiment of the invention.
Figure 7:
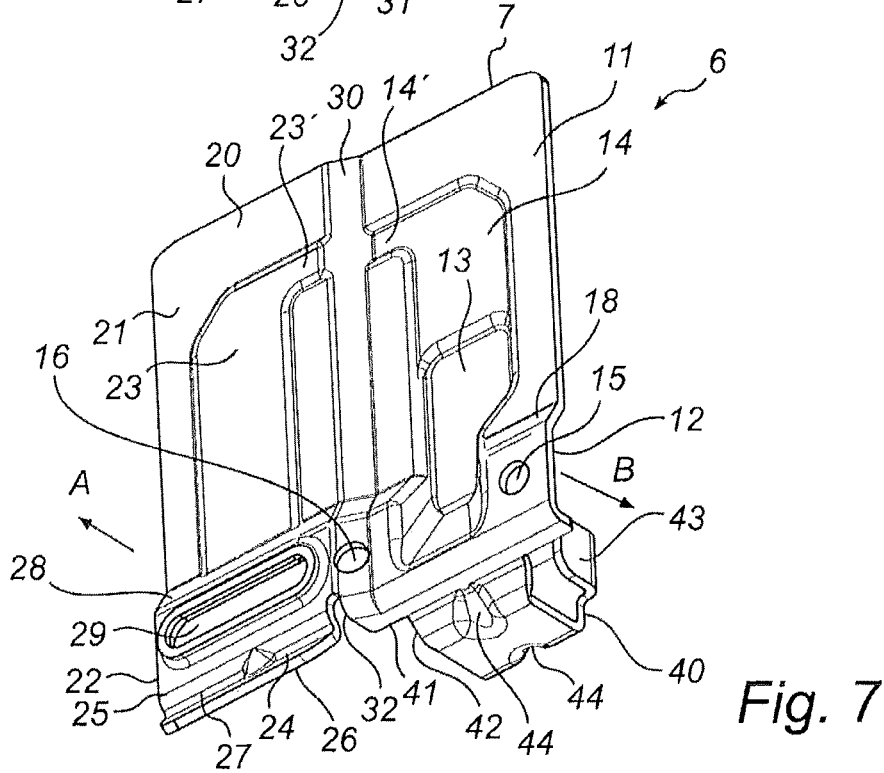
FIG. 7 is bottom perspective view of the lateral plate element shown in FIG. 6.

A lateral plate element 6 according to a first embodiment of the present invention is illustrated in FIGS. 6 and 7. The lateral plate element 6 is typically made of stainless steel. However, the skilled person realizes that other materials such as aluminum or titanium also are suitable.

The lateral plate element 6 includes an outer plate section 10, an inner plate section 20 and a bridging plate section 30 bridging said outer and inner plate sections 10, 20.

The outer plate section 10 comprises a top subsection 11. The top subsection 11 of the outer plate section 10 extends in a first plane. Also the inner plate section 20 comprises a top subsection 21. The top subsection 21 of the inner plate section 20 extends in a second plane. The second plane is being offset in an inward direction A (towards the center of the conveyor belt 1 when the lateral plate element 6 is mounted therein) with regard to said first plane. Said second plane is preferably substantially parallel with said first plane as shown in the disclosed first embodiment.

The outer plate section 10 further comprises a bottom subsection 12 arranged in a bottom part of said outer plate section 10 and extending in a third plane being offset in said inward direction A with regard to said first plane. Said third plane is preferably substantially parallel with said first plane as shown in the disclosed first embodiment.

The inner plate section 20 further comprises a bottom subsection 22 arranged in a bottom part of said inner plate section 20 and extending in a fourth plane being offset in said inward direction A with regard to said second plane. Said fourth plane is preferably substantially parallel with said second plane as shown in the disclosed first embodiment.

The offsets between said second plane and said first plane, between said third plane and said first plane and between said fourth plane and said second plane is preferably essentially the same.

Thus, the inner plate section 20 is offset in said inward direction A with respect to the outer plate section 10. Although not required, the offset is preferably at least the thickness t of the plate material constituting the lateral plate element 6 and at most two times the thickness t of the plate material constituting the lateral plate element 6.

The inner plate section 20 being offset the outer plate section 10 enables the outer plate section 10 on a adjacent link means 4 to extend over the outer surface of the inner plate section 20 on the adjacent link means 4, see FIGS. 2 and 3. During assembly, the inner plate section 20 on one link means 4 and the outer plate section 10 on the adjacent link means 4 overlap and enables thereby the adjacent lateral plate elements 6 to slide together as the belt 1 moves from a straight or helical path 2, 3, respectively.

The offset of the bottom subsection in relation to the top subsection of the outer plate section and the inner plate section, respectively, enables stacking of one belt tier on top of another belt tier without deformation of the lateral plate elements of the link means in the underlying belt tier.

The lateral plate element 6 further comprises a reinforcement 13 extending between the top subsection 11 and the bottom subsection 12 of the outer plate section 10. The reinforcement 13 is in the shown embodiment in the form of a press shaped structure bulging in an outward direction B (away from the center of the conveyor belt 1 when the lateral plate element 6 is mounted therein). Said outward direction B is opposite said inward direction A. As a non-limiting example the extension, in the outward direction B, of the reinforcement 13 is 0.5 to 4 times the thickness t of the plate material constituting the lateral plate element 6. Being in the form of a press shaped structure the reinforcement 13 is easy and cheap to manufacture. Due to that the reinforcement 13 is bulging in said outward direction B the reinforcement 13 does not interfere with the inner plate section 20 of an adjacent lateral plate element 6 of the conveyor belt 1. The reinforcement 13 provides the lateral plate element 6 with an enhanced bending stiffness, thereby ensuring high stability of the lateral plate element. Especially, the reinforcement 13 prevents the lateral plate element 6 to bend along a section 18 bridging said top and bottom subsections 11, 12 of the outer plate section 10. The reinforcement 13 in the form of a press shaped structure may also provide flatness to the outer plate section 10. As a non-limiting example the reinforcement 13 covers 10%-30% of the area of the outer plate section 10.

Further, the top subsection 11 of the outer plate section 10 comprises a first press shaped portion 14. The first press shaped portion 14 enhances the overall stiffness of the lateral plate element 6. The first press shaped portion 14 merges with the reinforcement 13. Moreover, the first press shaped portion 14 provides flatness to the top subsection of the outer plate section 10. In order for the first press shaped portion 14 to provide said flatness, the first press shaped portion 14 should preferably cover 20%-80%, and more preferably 40%-70% of the area of the top subsection 11 of the outer plate section 10. In order not to interfere with the inner plate section 20 of an adjacent lateral plate element 6 of the conveyor belt 1, the first press shaped portion bulges in said outward direction B. As a non-limiting example the extension, in the outward direction B, of the first press shaped portion 14 is 0.25 to 1 times the thickness t of the plate material constituting the lateral plate element 6.

The top subsection 21 of the inner plate section comprises a second press shaped portion 23. The second press shaped portion 23 enhances the overall stiffness of the lateral plate element 6. Moreover, the second press shaped portion 23 provides flatness to the top subsection of the inner plate section 20. In order for the second press shaped portion 23 to provide said flatness the second press shaped portion 23 should preferably cover 20%-80% and more preferably 40%-70% of the area of the top subsection 21 of the outer plate section 20. In order not to interfere with the outer plate section 20 of an adjacent lateral plate element 6, 6' of the conveyor belt 1 the second press shaped portion bulges in said inward direction A. As a non-limiting example the extension, in the inward direction A, of the second press shaped portion 23 is 0.25 to 1 times the thickness t of the plate material constituting the lateral plate element 6. Furthermore, by extending the second press shaped portion 23 to the bridging portion 28 between the top and bottom subsections 21, 22 of the inner plate section 20 the bending rigidity of the border between the top subsection 21 of the inner plate section 20 and the bridging portion 28 between the top and bottom subsections 21, 22 of the inner plate section 20 is enhanced.

Each of the first and second press shaped portions 14, 23 comprises an arm 14', 23' extending towards the bridging plate section 30. The arms 14', 23' are arranged to face each other. The arms 14', 23' further enhances the overall stiffness and flatness of the lateral plate element 6.

The lateral plate element 6 further comprises a first rod connection opening 15 and a second rod connection opening 16. The first rod connection opening 15 is arranged in the bottom subsection 12 of the outer plate section. The second rod connection opening 16 is arranged in a bottom part 31 of said bridging plate section 30. Each rod connection opening 15, 16 is arranged to receive a transverse rod 5, 5'. Normally, when producing a link means 4 two opposite and mirrored lateral plate elements 6, 6' are joined together by means of two transverse rods 5, 5'. The rods 5, 5' are introduced into respective rod connection opening 15, 16 and a weld is arranged between respectively rod 5, 5' and the lateral plate element 6, 6' adjacent to respectively rod opening 15, 16 in order to fixedly fasten the rods 5, 5' to the lateral plate elements 6, 6'. Normally, the rods 5, 5' extend perpendicular with respect to said first, second, third and fourth planes.

The bottom part 31 of said bridging plate section 30 is angled with respect to said first, second, third and fourth planes. Thus, by arranging the second rod connection opening 16 in the bottom part 31 of said bridging plate section 30, the stress on the weld between respectively rod 5, 5' and the lateral plate element 6, 6' adjacent to respectively rod opening 15, 16 is reduced.

Preferably the reinforcement 13 extends below the two rod connection openings 15, 16. By extending the reinforcement 13 below the two rod connection openings 15, 16 the section along the axis between the two rods of the lateral plate element is reinforced. The section along the axis between the two rods of the lateral plate element is a vulnerable section along which the lateral plate element may be bent when applying a momentum on a lateral plate element.

The outer plate section 10 further comprises a bottom structure 40 connected to a bottom edge 17 of the bottom subsection 12 of the outer plate section 10. The bottom structure 40 extends from the outer plate section 10 in said outward direction B. The bottom structure 40 comprises a resting surface 41 adjoining said bottom edge 17, a first abutment surface 42 adjoining said resting surface 41 and two welding surfaces 43 onto which a respectively end of the transverse rods 5, 5' is to be welded, see FIGS. 2-5 wherein the rods 5, 5' are welded to respectively welding surface 43.

The resting surface 41 may be planar as in the shown embodiment. The resting surface extends in a plane orthogonal to said third plane and parallel to an axis connecting the centre of the two rod connection openings 15, 16. During use, the upper edge 7 of a lateral plate element 6 of a link means of an underlying tier contacts the resting surface 41, above described as the lower edge portion 8, of the lateral plate elements 6, of a link means of an overlaying tier. Thus, the tiers of the conveyor belt in the helical path are lateral aligned by resting the upper edge 7 of the lateral plate elements 6 of the link means of an underlying tier against the resting surfaces 41 of the lateral plate elements 6 of the link means of an overlying tier.

The resting surface 41 is offset from said two rod connection openings 15, 16. Thus, when the conveyer belt 1 is stacked in tiers, the upper edge of a lateral plate element 6 of a link means 4 of an underlying tier rests solely against the resting surface 41 of a lateral plate element 6 of a link means 4 of an overlying tier. Because the weight of the portion of the conveyor belt 1 above the link means 4 is no longer exerted on the transverse rods 5, 5', wear on the transverse rods 5, 5' is reduced.

Moreover, the resting surface 41 extends to a bottom edge 32 of the bridging plate section 30. Thus, the resting surface 41 is, at least locally, extended laterally in said inward direction A. By extending the resting surface 41 to the bottom edge 32 of the bridging plate section 30, wedging between a lower and upper lateral plate element 6 in the conveyor belt 1 is prevented. This is because the upper portion 7 of a lateral plate element 6 is prevented from wedging in between the inner and outer plate sections 10, 20.

The first abutment surface 42 extends diagonally downward and outward (in the outward direction B) from said resting surface 41. The first abutment surface 42 limits outward lateral movement of a lateral plate element 6 of an underlying tier. Thus, when the lateral plate elements 6 form part of a link means 4 of a conveyor belt 1, the first abutment surfaces 42 of successive link means 4 form outer abutment surfaces engaging the outer side of the upper portions of the link means of an underlying belt tier.

The two welding surfaces 43 onto which an end of respectively transverse rods 5, 5' are to be welded extend in a plane orthogonal to said third plane and perpendicular to said axis connecting the centre of the two rod connection openings 15, 16. Welding the transverse rods 5, 5' to the welding surfaces 43 stiffens the lateral plate link 6 even further, especially the bottom part of the lateral plate element 6.

In order to further improve the stiffness of the lateral plate element 6 and especially the stiffness of the bottom structure 40, a dimple or dent 44 is arranged at the bottom structure 40.

The inner plate section 20 comprises a tab section 24 connected to a bottom edge 25 of the inner plate section 20. The tab section 24 comprises a second abutment surface 26 and a bottom spacer element 27.

The second abutment surface 26 extends diagonally downward and inward (in the inward direction A) from said bottom edge. The second abutment surface 26 limits inward lateral movement of a lower lateral plate element 6 over an upper lateral plate element 6 when the conveyor belt is in a self-stacked configuration. Moreover, the second abutment surface 26 limits outward lateral movement of an upper lateral plate element 6 over a lower lateral plate element 6 when the conveyor belt is in a self-stacked configuration. Thus, when the lateral plate elements 6 form part of a link means 4 of a conveyor belt 1 the second abutment surfaces 26 of successive link means 4 form inner abutment surfaces engaging the inner side of the upper portions of the link means of an underlying belt tier.

The bottom spacer element 27 extends in said outward direction B and is arranged to prevent lateral movement between lateral plate elements of neighboring tiers of the conveyor belt 1.

Moreover, the inner plate section 20 comprises a horizontally aligned elongated slot 29. During assembly, the transverse rod 5 on an adjacent link means 4 extends through the elongated slot 29 to loosely connect two adjacent link means 4 together. In a preferred embodiment, the two lateral plate elements 6, 6' both include a long elongated slot 29 equal in size thereby enabling the conveyor belt 1 to turn in both directions.

It will be appreciated that the present invention is not limited to the embodiments shown. Several modifications and variations are thus conceivable within the scope of the invention. For example, the reinforcement may be implemented in other ways such being welded or attached in another suitable way to the lateral plate element. In case the reinforcement comprises a profile attached to the lateral plate element, the reinforcement projects from the outer plate section in said outward direction B.

Figure 8:
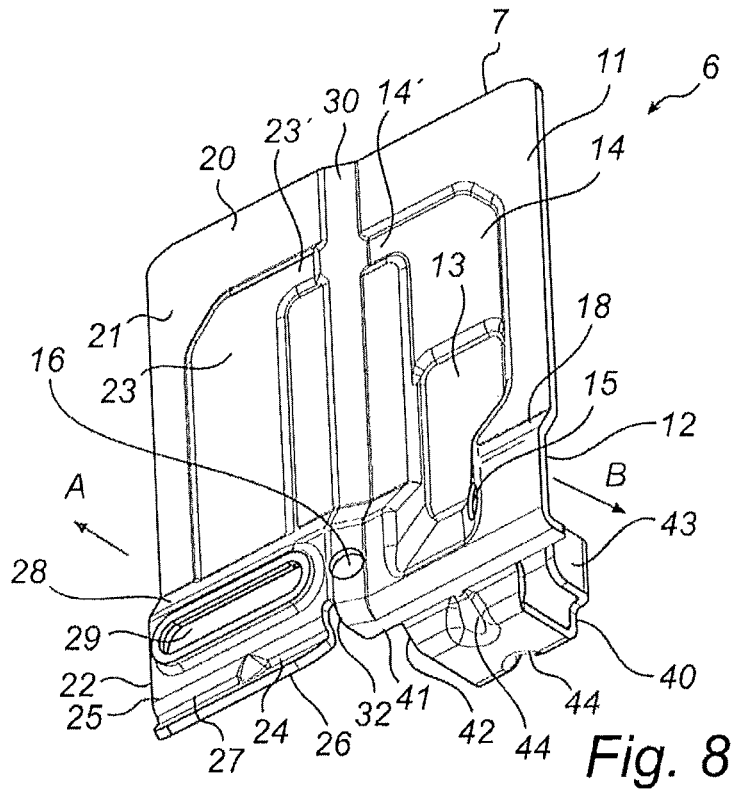
FIG. 8 is a bottom perspective view according to an alternative embodiment of a lateral plate element.

Moreover, one or both of the rod connection openings may be arranged within a section of the reinforcement 13 being angled with respect to said first, second, third and fourth planes. This alternative embodiment is illustrated in FIG. 8. Thus, by arranging a rod connection opening 15, 16 within a section of the reinforcement 13 being angled with respect to said first, second, third and fourth planes the stress on the weld between respectively rod 5, 5' and the lateral plate element 6, 6' adjacent to respectively rod opening 15, 16 is reduced.

Figure 9:
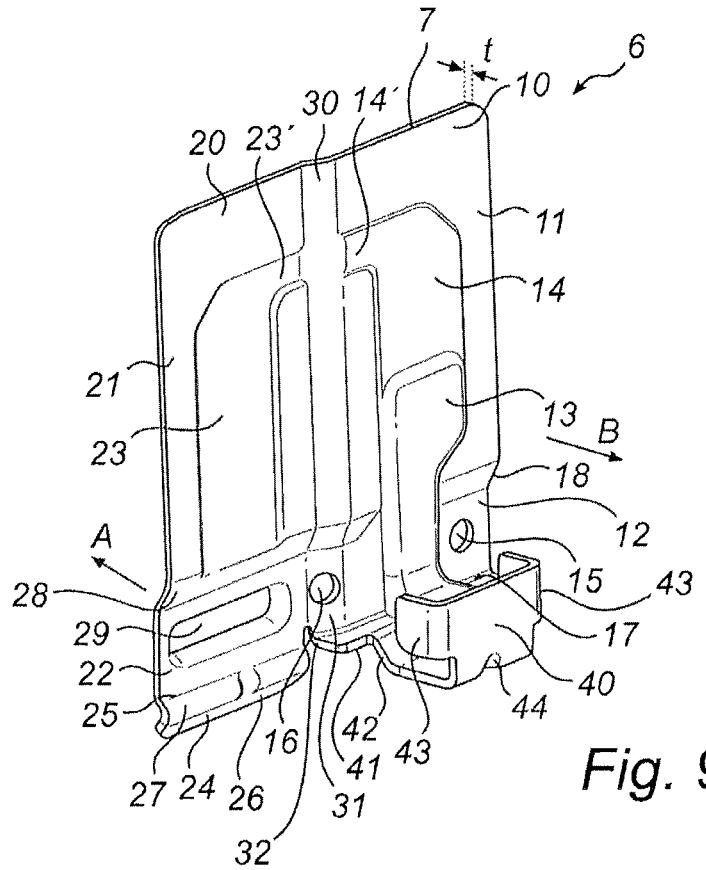
FIG. 9 is a top perspective view according to a further alternative embodiment of a lateral plate element.

Furthermore, the reinforcement 13 may extend into the resting surface 41 stiffening the transition between the bottom edge 17 of the bottom subsection 12 of the outer plate section 10 and the resting surface 41. This alternative embodiment is described in FIG. 9.

Moreover, the lateral plate element, especially a lateral plate element located at the inner side of the helical paths of the conveyor belt, may comprise perforations or holes in order to allow a flow of a gaseous medium horizontally through the lateral plate element.

Figure 10:
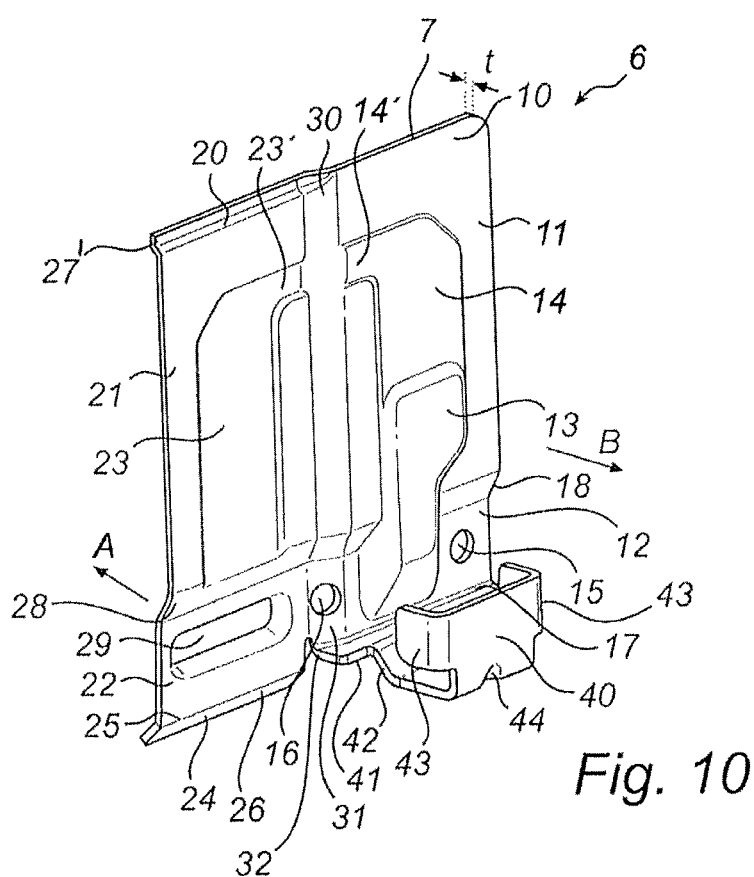
FIG. 10 is a top perspective view according to yet an alternative embodiment of a lateral plate element.

As an alternative or as a complement to the bottom spacer element 27 of the bottom subsection 22 of the inner plate section 20 a top spacer element 27' may be arranged in the top subsection 21 of said inner plate section 20, see FIG. 10. Such a top spacer element 27' extends in said inward direction A and is arranged to prevent lateral movement between lateral plate elements of neighboring tiers or the conveyor belt 1. In FIG. 10 an alternative embodiment of the lateral plate element comprising a top spacer element 27' is shown.

Furthermore, the bottom structure may comprise an arm extending to the top subsection of the outer plate section of the lateral plate element. Such an arm may be fixedly connected to the top subsection of the outer plate section by for example welding. By arranging such an arm extending from the bottom structure to the top subsection of the outer plate section of the lateral plate element the lateral plate element may be strengthened even more.

The invention claimed is:

1. A lateral plate element for a link means included in a self-stacking endless conveyor belt, in which the conveyor belt extends helically along part of its length, comprising:
    an outer plate section, an inner plate section and a bridging plate section bridging said outer and inner plate sections,
    wherein said outer plate section comprises a top subsection extending in a first plane and wherein said inner plate section comprises a top subsection extending in a second plane, said second plane being offset, in an inward direction, with regard to said first plane, wherein said second plane is substantially parallel with said first plane,
    wherein said inner plate section further comprises a bottom subsection arranged in a bottom part of said inner plate section and extending in a fourth plane being offset in said inward direction with regard to said second plane, wherein said fourth plane is substantially parallel with said second plane,
    wherein said outer plate section further comprises a bottom subsection arranged in a bottom part of said outer plate section and extending in a third plane being offset in said inward direction with regard to said first plane, wherein said third plane is substantially parallel with said first plane, and
    a reinforcement extending between the top subsection and the bottom subsection of the outer plate section, wherein the reinforcement is in the form of a press shaped structure bulging in an outward direction opposite said inward direction.

2. A lateral plate element according to claim 1, wherein at least one of the top subsections further comprises a press shaped portion.

3. A lateral plate element according to claim 1, further comprising at least two rod connection openings.

4. A lateral plate element according to claim 3, wherein at least one of said at least two rod connection openings is arranged in a part of said bottom subsection of the outer plate section over which part said reinforcement extends.

5. A lateral plate element according to claim 4, wherein one of said at least two rod connection openings is arranged in a bottom part of said bridging plate section.

6. A lateral plate element according to claim 5, further comprising a bottom structure connected to a bottom edge of the bottom subsection of the outer plate section, wherein the bottom structure extends in an outward direction opposite said inward direction and comprises a resting surface adjoining said bottom edge and extending in a plane orthogonal to said third plane and parallel to an axis connecting the center of the at least two rod connection openings, a first abutment surface adjoining said resting surface and extending diagonally downward and outward.

7. A lateral plate element according to claim 6, wherein the bottom structure further comprises at least one welding surface extending in a plane orthogonal to said third plane and perpendicular to said axis connecting the center of the at least two rod connection openings.

8. A lateral plate element according to claim 6, wherein the resting surface is offset from said at least two rod connection openings.

9. A lateral plate element according to claim 6, wherein the resting surface extends to a bottom edge of the bridging plate section.

10. A lateral plate element according to claim 6, wherein the reinforcement extends into the resting surface.

11. A lateral plate element according to claim 1, further comprising a tab section connected to a bottom edge of the inner plate section, wherein the tab section extends in the inward direction and comprises a second abutment surface extending diagonally inward and downward.

12. A lateral plate element according to claim 11, wherein the tab section further comprises a bottom spacer element extending in an outward direction opposite said inward direction.

13. A lateral plate element according to claim 1, further comprising a top spacer element extending in the inward direction and being arranged in the top subsection of said inner plate section.

14. A lateral plate element according to claim 3, wherein one of said at least two rod connection openings being arranged in a bottom part of said bridging plate section.

15. A lateral plate element according to claim 3, further comprising a bottom structure connected to a bottom edge of the bottom subsection of the outer plate section, wherein the bottom structure extends in an outward direction opposite said inward direction and comprises a resting surface adjoining said bottom edge and extending in a plane orthogonal to said third plane and parallel to an axis connecting the center of the at least two rod connection openings, a first abutment surface adjoining said resting surface and extending diagonally downward and outward.

16. A lateral plate element according to claim 4, further comprising a bottom structure connected to a bottom edge of the bottom subsection of the outer plate section, wherein the bottom structure extends in an outward direction opposite said inward direction and comprises a resting surface adjoining said bottom edge and extending in a plane orthogonal to said third plane and parallel to an axis connecting the center of the at least two rod connection openings, a first abutment surface adjoining said resting surface and extending diagonally downward and outward.

17. A lateral plate element according to claim 7, wherein the resting surface extends to a bottom edge of the bridging plate section.

18. A link means for a self-stacking endless conveyor belt, in which the conveyor belt extends helically along part of its length, wherein the link means comprises at least two transverse rods and two lateral elements each comprising an outer plate section, an inner plate section, and a bridging plate section bridging said outer and inner plate sections, wherein said outer plate section comprises a top subsection extending in a first plane and wherein said inner plate section comprises a top subsection extending in a second plane, said second plane being offset, in an inward direction, with regard to said first plane, wherein said second plane is substantially parallel with said first plane, wherein said inner plate section further comprises a bottom subsection arranged in a bottom part of said inner plate section and extending in a fourth plane being offset in said inward direction with regard to said second plane, wherein said fourth plane is substantially parallel with said second plane, wherein said outer plate section further comprises a bottom subsection arranged in a bottom part of said outer plate section and extending in a third plane being offset in said inward direction with regard to said first plane, wherein said third plane is substantially parallel with said first plane, and a reinforcement extending between the top subsection and the bottom subsection of the outer plate section, wherein the reinforcement is in the form of a press shaped structure bulging in an outward direction opposite said inward direction, wherein the at least two rods are fixedly connected to said lateral elements in order to form the link means.

19. A self-stacking endless conveyor belt, in which the conveyor belt extends helically along part of its length and comprises a plurality of interconnected link means each comprising at least two transverse rods and two lateral elements, wherein each lateral element comprises an outer plate section, an inner plate section, and a bridging plate section bridging said outer and inner plate sections, wherein said outer plate section comprises a top subsection extending in a first plane and wherein said inner plate section comprises a top subsection extending in a second plane, said second plane being offset, in an inward direction, with regard to said first plane, wherein said second plane is substantially parallel with said first plane, wherein said inner plate section further comprises a bottom subsection arranged in a bottom part of said inner plate section and extending in a fourth plane being offset in said inward direction with regard to said second plane, wherein said fourth plane is substantially parallel with said second plane, wherein said outer plate section further comprises a bottom subsection arranged in a bottom part of said outer plate section and extending in a third plane being offset in said inward direction with regard to said first plane, wherein said third plane is substantially parallel with said first plane, and a reinforcement extending between the top subsection and the bottom subsection of the outer plate section, wherein the reinforcement is in the form of a press shaped structure bulging in an outward direction opposite said inward direction, wherein the at least two rods are fixedly connected to said lateral elements in order to form each link means.

20. An air conditioning plant comprising a self-stacking endless conveyor belt in which the conveyor belt extends helically along part of its length and comprises a plurality of interconnected link means each comprising at least two transverse rods and two lateral elements, wherein each lateral element comprises an outer plate section, an inner plate section, and a bridging plate section bridging said outer and inner plate sections, wherein said outer plate section comprises a top subsection extending in a first plane and wherein said inner plate section comprises a top subsection extending in a second plane, said second plane being offset, in an inward direction, with regard to said first plane, wherein said second plane is substantially parallel with said first plane, wherein said inner plate section further comprises a bottom subsection arranged in a bottom part of said inner plate section and extending in a fourth plane being offset in said inward direction with regard to said second plane, wherein said fourth plane is substantially parallel with said second plane, wherein said outer plate section further comprises a bottom subsection arranged in a bottom part of said outer plate section and extending in a third plane being offset in said inward direction with regard to said first plane, wherein said third plane is substantially parallel with said first plane, and a reinforcement extending between the top subsection and the bottom subsection of the outer plate section, wherein the reinforcement is in the form of a press shaped structure bulging in an outward direction opposite said inward direction, wherein the at least two rods are fixedly connected to said lateral elements in order to form each link means.

* * * * *

UNITED STATES PATENT AND TRADEMARK OFFICE
CERTIFICATE OF CORRECTION

| | | |
|---|---|---|
| PATENT NO. | : 8,800,757 B2 | Page 1 of 1 |
| APPLICATION NO. | : 13/996267 | |
| DATED | : August 12, 2014 | |
| INVENTOR(S) | : J. Malmberg et al. | |

It is certified that error appears in the above-identified patent and that said Letters Patent is hereby corrected as shown below:

On the title page

Item (30) "1051354" should read --1051354-7--

Signed and Sealed this
Twenty-fourth Day of February, 2015

Michelle K. Lee
*Deputy Director of the United States Patent and Trademark Office*